United States Patent
Habon et al.

(10) Patent No.: US 7,415,675 B2
(45) Date of Patent: Aug. 19, 2008

(54) SOFTWARE TRAINING METHOD AND APPARATUS

(75) Inventors: Michael W. Habon, Frickingen (DE); Joerg H. Habon, Immenstaad (DE); Harald L. Falter, Lindau (DE); Axel Luther, Wiesloch (DE); Ursula A. C. Markus, Saarbrücken (DE); Uwe W. Sester, Ladenburg (DE); Paul P. Tanzer, Überlingen (DE); Rainer P. B. Zinow, Neustadt (DE); Kurt R. Bauer, Wiesloch (DE)

(73) Assignee: SAP AG, Walldorf (DE)

( * ) Notice: Subject to any disclaimer, the term of this patent is extended or adjusted under 35 U.S.C. 154(b) by 532 days.

(21) Appl. No.: 11/048,006

(22) Filed: Jan. 31, 2005

(65) Prior Publication Data

US 2006/0047544 A1 Mar. 2, 2006

(51) Int. Cl.
*G06F 13/00* (2006.01)
*G06F 15/00* (2006.01)

(52) U.S. Cl. ............................ 715/765; 715/751; 707/1
(58) Field of Classification Search ......... 715/763–765, 715/853–854, 780–784, 751; 707/1–3
See application file for complete search history.

(56) References Cited

U.S. PATENT DOCUMENTS

| | | | | |
|---|---|---|---|---|
| 6,471,521 | B1 * | 10/2002 | Dornbush et al. | 434/322 |
| 6,773,266 | B1 * | 8/2004 | Dornbush et al. | 434/322 |
| 7,120,626 | B2 * | 10/2006 | Li et al. | 707/3 |

* cited by examiner

*Primary Examiner*—Cao Nguyen
(74) *Attorney, Agent, or Firm*—Kenyon & Kenyon LLP

(57) ABSTRACT

A software training approach utilizes customized training activities to provide effective customized learning operations for users. Through an association of the user identifier, such as a login, an application determines when an activity occurs requiring training. Based on the user identifier, a customized training activities are retrieved and executed providing a software training based on the specific user in immediate proximity to the actual operation of the computing activity being the subject of the training operations.

21 Claims, 4 Drawing Sheets

SOFTWARE TRAINING METHOD AND APPARATUS

BACKGROUND

The present invention relates generally to the area of training techniques and more specifically to software training techniques embedded within a software application.

Success of a new software application depends on the ability of users to effectively learn and utilize the software. Unfortunately, nearly all computer software today is designed around processing data with little or no consideration of how people need to use it to perform their work tasks. As a result, training services, software documentation and end user support services have flourished as a way to help users figure out how to work around these systems.

Current software training techniques include general classroom training sessions, online tutorials and third party training resources. These systems typically employ a general teaching approach to accommodate the wide variety of users. These training approaches cannot provide individual customized training. Thus the users are often limited in their training for utilizing the new software, reducing productivity.

With continued advancements in software applications, it is important to keep users abreast of new techniques. If users fail to grasp the improvements of existing systems, these shortcomings will only be perpetuated with new systems. This is problematic because after several generations of new technologies, the user may be severely restricted in the ability to use the software, increasing the likelihood that the user will not use the improved software, but will reduce productivity using the comfortable previous generation software system.

Current software training also use other readily available training techniques. For example, some systems may utilize pop-up windows having visual demonstrations of a particular application resource. Other approaches may include a user prompting a system to run a tutorial when the user first launches a software package or is confused during operation. For example, in one technique, an application may detect its initial execution and provide tutorials or other general training techniques. In another example, an application may automatically provide a tip every time the application is launched. In another technique, the application may monitor the user's usage and attempt to predict an activity, such as drafting a letter. Upon this prediction, the application may launch a general tutorial or an instructional tool for the specific activity.

The current software training approaches are standardized approaches lacking customization directed to specific users. As the complexity of the underlying software increases, the software training techniques should be customizable to focus on the target audience of the intended user. Therefore, there exists a need for software training technique using a customized technique for targeted training of software users.

DETAILED DESCRIPTION

Through using targeted software training techniques, users are provided with directed training consistent with the intended usage of the software. This training techniques improves user functionality by the elimination of ineffective software training time and allowing the user to practice the feature just before actual performance.

Furthermore, through the use of a user-specific training objects, the software training is customizable. The training objects are data structures that include executable elements that provide targeted software training, as discussed in further detail below. The execution of the training object generates a training session which is one or more computing activities directed to instructions for performing a particular software feature. The training session may be a multi-media display, an interactive program, a demonstration or any other suitable output for instructing the user on using the software application.

Based on user identification, specific training objects are retrieved from a training database and executed. These training objects are customized based on the user and provide targeted training based on the activities the user encounters with the software application. For example, if the user is within the billing department, the training objects may focus more specifically on accessing billing information compared with a sales manager who may focus more on using the software for sales projections.

Through the customized training approach embedded within the software application, users are able to train not only on an individual basis, but also train on specific tasks prior to completion of those tasks. Instead of spending hours learning multiple processing tasks, the user learns a single task and then performs that single task. If a user makes a mistake in executing the program after training, the user may then automatically rerun the training object instead of wasting time guessing at completing the operation.

Figure 1:
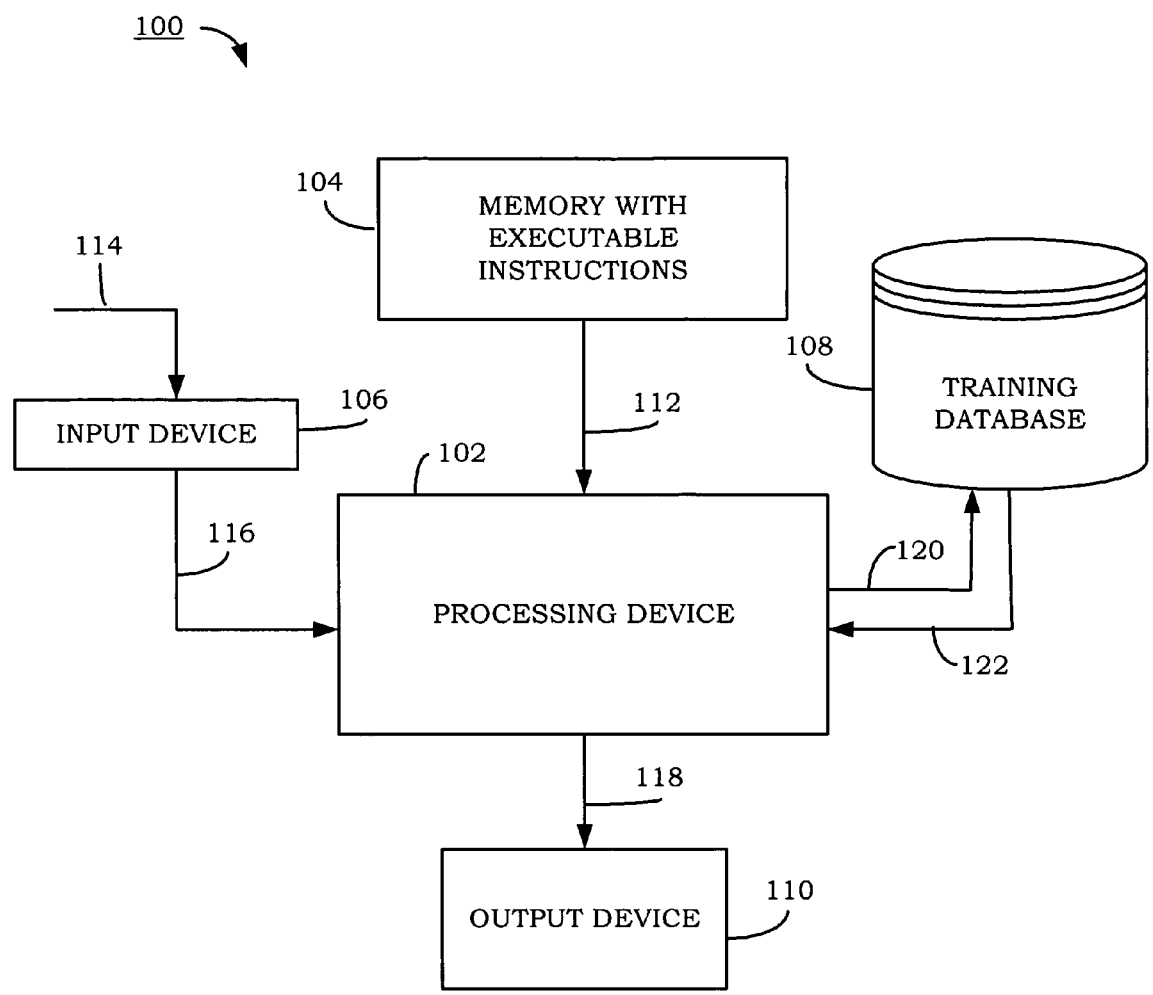
FIG. 1 illustrates a block diagram of one embodiment of an apparatus for a targeted software training technique.

FIG. 1 illustrates one embodiment of a processing apparatus 100 allowing for targeted software training. The apparatus 100 includes a processing device 102, a memory device having executable instructions 104, an input device 106, a training database 108 and an output device 110. While the system 100 may be similar to previous electronic training systems, the processing device 102 provides training activities based on the identification of the user, compared with the previous techniques of generalized training activities, independent of the user.

The processing device 102 may be, but not limited to, a single processor, a plurality of processors, a DSP, a microprocessor, an ASIC, a state machine, or any other implementation capable of processing and executing software. The term processor should not be construed to refer exclusively to hardware capable of executing software and may implicitly include DSP hardware, ROM for storing software, RAM, and any other volatile or non-volatile storage medium. The memory 104 and training database 108 may be any suitable memory or storage location operative to store sales information or any other suitable information therein including, but not limited to, a single memory, a plurality of memory locations, shared memory, CD, DVD, ROM, RAM, EEPROM, optical storage, microcode, or any other non-volatile storage capable of storing information.

In response to executable instructions 112 from the memory 104, the processing device 102 performs executable operations for a software application, such as a new software application or an updated version of a previously released software application. The processing device 102 also operates executable instructions that, as described in further detail below, detect when a training session is appropriate and which training object should be executed.

In the apparatus 100, the input device 106, which may be any suitable input device as recognized by one having ordinary skill in the art, receives a user input command 114 and generates an input signal 116, provided to the processing device 102. The input signal 116 includes inputs providing for a user identification, such as a login, and commands for controlling the operation of the software running on the processing device.

The processing device 102 is coupled the output device 110 and is operative to receive an output signal 118. The output signal 118 provides an output display, including, but not limited to, a visual display on a monitor and auditory display on an audio system. Through the input device 106 and the output device 110, the user may operate the processing device 102 executing software instructions in accordance with well known processing techniques.

Further included with the executable instructions 112 are instructions to detect when a training session may be utilized, based on the user selection of a computing event to be executed. A computing event may be any event capable of being performed by the host software application. For example, based on the software application, the initial launch of a specific feature within the application may trigger the training session. Other examples may include the user directly activating the training session through any suitable means such as a pull down menu, a quick link, a hot key combination, or repeated erroneous operations.

The detection by the software may be accomplished by monitoring user activity and comparing actions against a reference list, such as denoting the first time a particular action is launched, for example the first time a form letter is generated. This detection is also based on the identification of the specific user, for example, if the user is determined to be an experienced user and the software detects the initial launch of a remedial task, training may be deemed unnecessary.

The processing device 102, in response to the executable instructions 112, accesses the training database 108 with a training object request 120. The training object request 120 includes a user indicator, such as the identity of the specific user or general information about the user, for example that the user is a salesperson with limited computer background.

The training database 108 provides a training object 122 to the processing device, wherein the training object 122 includes executable instructions to be executed by the processing device 102. In one embodiment, the training database 108 provides the training object 120 based on the user. For example, for a particular software function, such as generating a business correspondence, the training activity of the training object may be customized for the user's specific role and most likely type of correspondence, including which type of information to be placed in the letter and the proper formatting.

In one embodiment, the association of the user with the training objects 120 may be pre-associated in the training database. The training objects may be generated and stored in the training database. The processing device thereupon executes the training object 122 prior to executing the programmable activity, providing the training for improved usability of the underlying software application.

Figure 2:
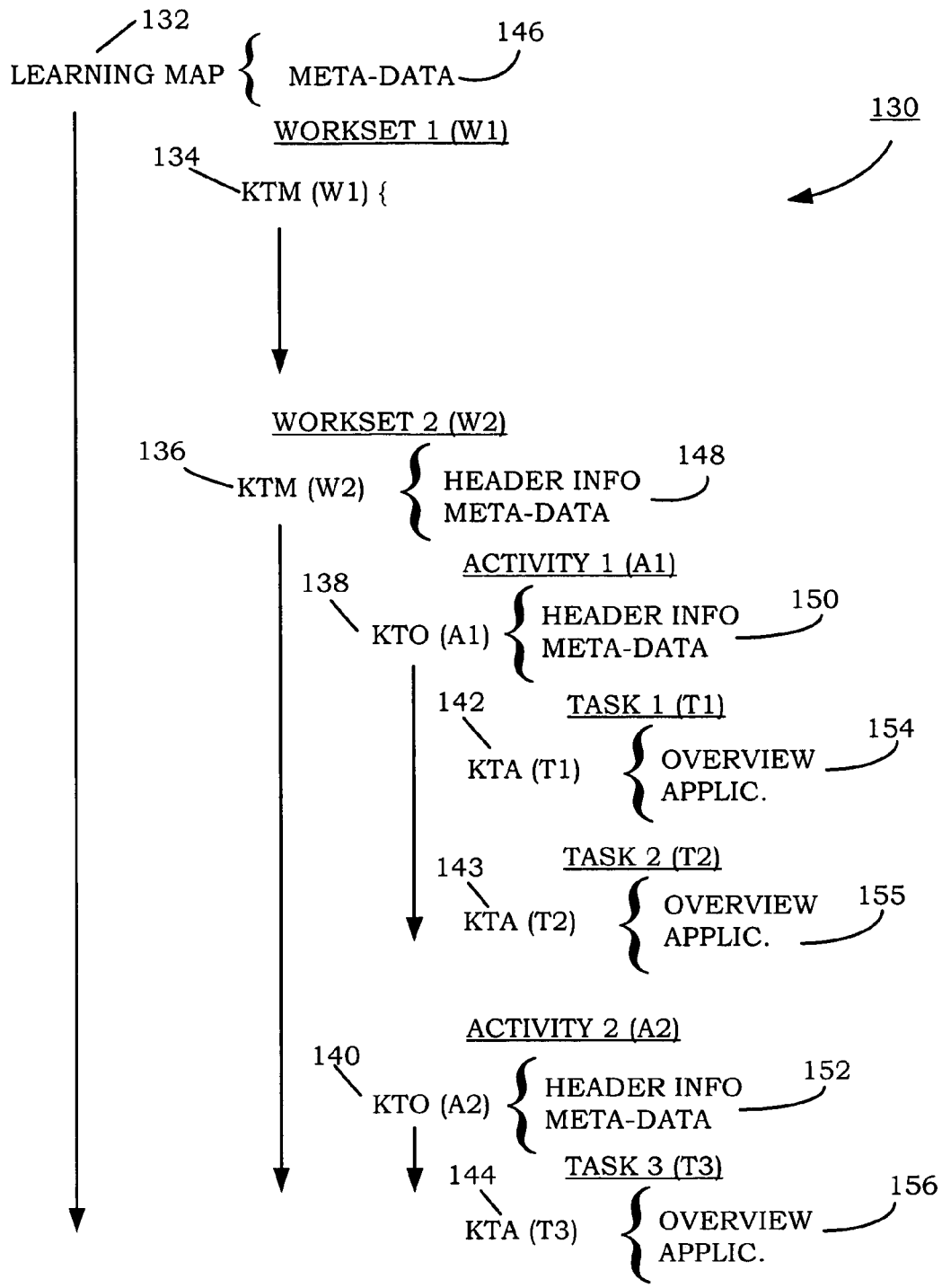
FIG. 2 illustrates a graphical representation of an exemplary portion of encoding of a training object.

FIG. 2 illustrates one embodiment of a data hierarchy for a training session encoded within a training object 130. The training object 130 includes multiple data structures that include executable operations that when executed by a processing device, train the user on the specific operations.

A general data structure within the training object is a learning map 132. The learning map includes knowledge transfer modules (KTMs) 134 and 136. The KTMs 134 and 136 include training objects (KTOs) 138 and 140, which include knowledge transfer assets (KTAs), such as KTAs 142 and 144 within KTM 140.

The learning map 132 includes other information 146, such as header information and meta-data describing the contents of the learning map 132 and the KTMs 134 and 136. Based on the structure of the learning map 132, any suitable number of different KTMs may be contained therein, allowing for a high degree of flexibility in the scope of the data in the learning map 134. In one embodiment, the KTMs are designated by associated workset headings to define the general training operation.

The KTMs 134 and 136 are data structures that store further data structures of the KTOs 1348 and 140. the KTMs 134 and 136 also store other information 148, such as header information and meta-data describing the contents of the KTM and pretest applications (as discussed in further detail below). Based on the structure of the KTM 134 and 136, any suitable number of different KTOs may be contained therein, allowing for a high degree of flexibility in the scope of the data in the KTM. In one embodiment, the KTOs are designated by associated activity headings to define a more specific objective of the training operation.

The KTOs 138 and 140 are data structures that store data capable of being executed by a processing device. The KTOs 138 and 140 also store other information 150 and 152, such as, but not limited to, header information, meta-data describing the contents of the KTO, a self-test operations as described below, active linking to remedial learning opportunities and explanation/demonstration of new operations through overviews and simulations. The KTOs 138 and 140 provide direct training information that can be shared, reused, and/or repurposed for multi-format delivery of educational products, such as instructor-led training (ILT), e-learning, live/virtual classroom sessions, just-in-time learning. The KTO facilitates training activities for mastering a single, specific learning objective associated with the operation of the underlying software application. This training activity is generated by the processing device executing the KTAs 142-144 disposed within the KTOs 138 and 140.

The KTAs 142-144 are specific executable operations that when executed by the processing device, generate the training materials. The KTAs 142-144 include specific individualized learning elements, such as a multi-media display, a text file, a sound file, an interactive form or any other output. For example, the data 154-156 of the KTAs 142-144 may include a general overview data file that includes meta-data describing the training objective of the task and an application which is executed by the processing device to provide the training activities. In one embodiment, the KTAs 142-144 are characterized based on tasks and include the data 154-156 to accomplish those tasks.

The learning map 132 is associated with an indicated user, such as through a login, a group of users, a user grouped into a skill level rating or any other suitable indicator of a particular user seeking to perform a computing activity capable of being enhanced by the training objects.

In one embodiment, the learning map 132 provides performance-based self-tests. In this self-test application, the application does not provide prompts and expects the user to complete an activity without guidance or direct feedback. The self-test keeps scoring information and shows the user's ability at the end of the self-test. The status of work on the KTO may be automatically set as completed and the objective will be marked as mastered, when the user has successfully completed the simulation. As described below, one embodiment includes a master list of training objects relating to a particular user. This master list may be stored in a readily accesible memory location such that the list may be used to determine a proper training object for a user by eliminating extraneous KTOs.

In one embodiment, the KTA can be described with sharable content object reference model (SCORM) metadata to allow for searching the training objects database. In one embodiment, the KTOs and KTMs are also displayable with a SCORM Player. The structure of the KTO is similar to the KTAs so that users are free to decide which KTOs or specific KTAs within the KTOs, the user wants to work on first. In one embodiment, this may be accomplished using a visual interactive interface illustrating a graphical representation of the various KTAs that make up the KTO, wherein a user may actively select one or more of the KTAs for execution.

Figure 3:
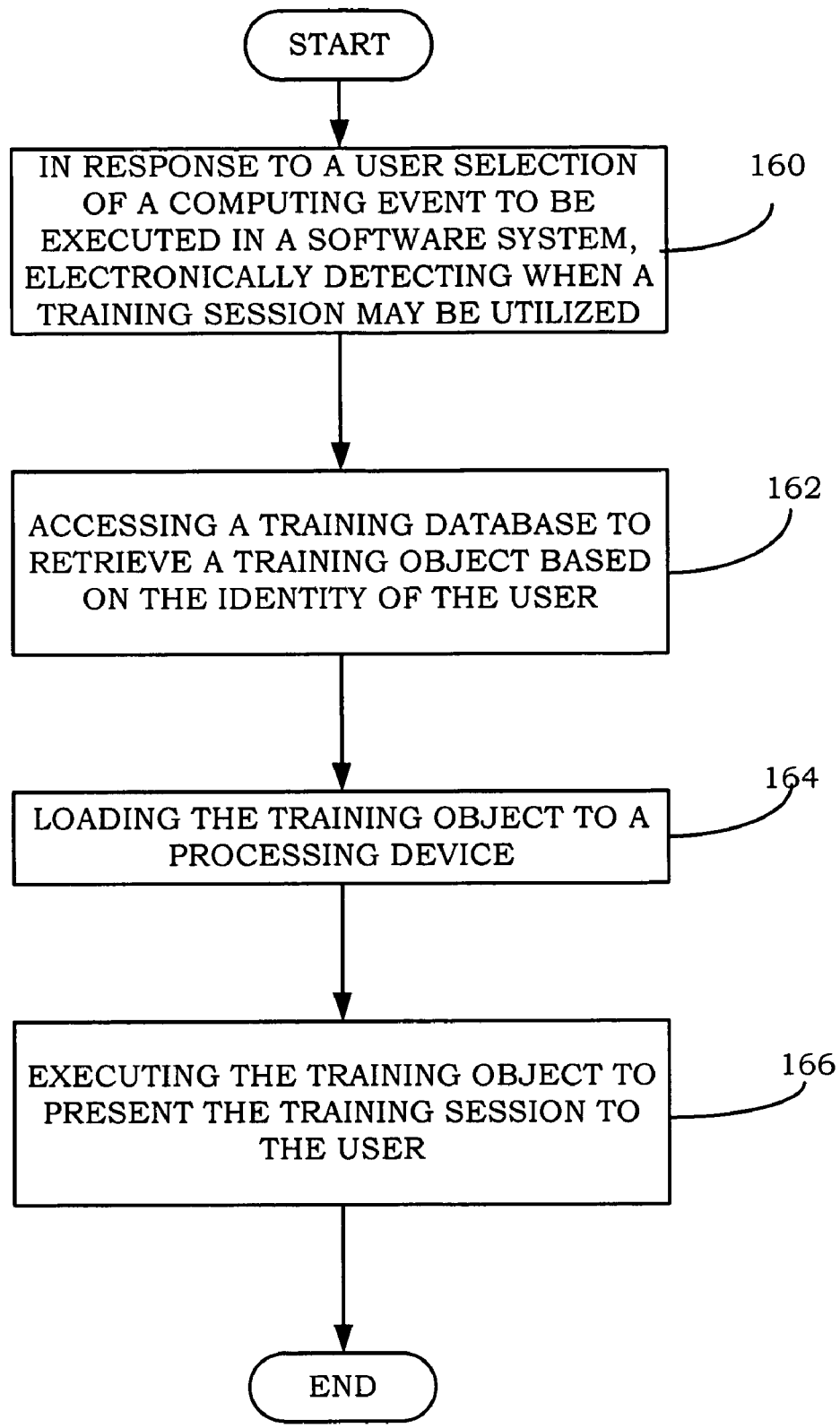
FIG. 3 illustrates a flow chart of the steps of one embodiment of a method for software training.

FIG. 3 illustrates a flowchart of a method for software training. The method begins, step 160, electronically detecting when a training session may be utilized, in response to a user selection of a computing event to be executed in the software system. For example, this determination may be when a user launches a program feature for the first time. As noted above, this step may be performed by tracking user activities.

The next step, step 162, is accessing a training database to retrieve a training object based on the identity of the user. In one embodiment, the training database is accessed using the user identification to retrieve the training object based on the user identifier. For example, a particular user may be referenced to a designated skill level in the training database, or in another embodiment, specific training objects may be assigned to the individual user. For example, the training database may include numerous training objects catalogued to be referenced by designated users, where the cataloging may be done based on the experience level and usage activities of the user.

In another embodiment, the user identification may include a user skill level identifier that identifies the skill level of the user. For example, the skill level may be designated by experience level, such as novice, intermediate, expert. In another example, the skill level may be an iterative element determined based on user access to the underlying software application, including noting how effectively the user uses the software. Whereas, the user identification may also include usage-type identifier. As discussed above, the training objects may be customized based on how the user uses the software, therefore the training objects may be catalogued based on the type of user, such as a salesmen, analyst, etc. The usage-type identifier may also identify the assigned user-usage of the software application, such as for accounting, ordering, inventory, or other uses.

The next step, step 164, is loading the training object. This training object may be loaded into a processing device, such as the processing device 102 of FIG. 1. The processing device is operative to perform step 166, which is executing the training object to present the training session to the user. During this step, the KTAs within the KTOs of the KTMs within the learning map are executed by the processor and training activities are provided to the user. Thereupon, in this embodiment, the method is complete.

In another embodiment, the learning map itself may be visibly displayed for the user prior to execution. The visible display may illustrate the various KTMs, KTOs and KTAs that are apart of the learning map. Based on the visible display, such as using a SCORM player, the user may actively select various components for directed learning. Therefore, instead of automatically launching an individualized learning map, the user may select an even more individual learning approach through selected learning map elements.

Figure 4:
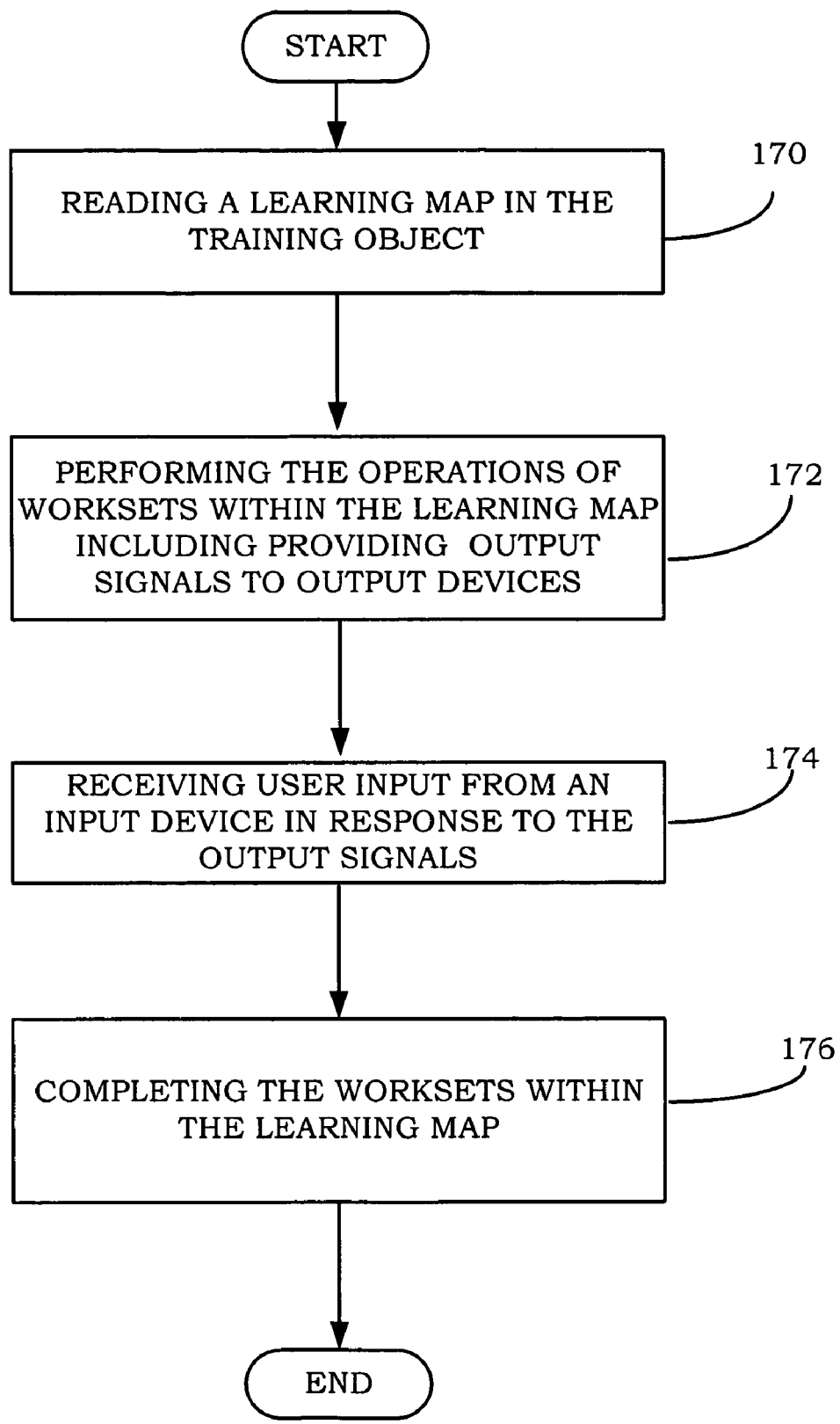
FIG. 4 illustrates a flow chart of the steps of one embodiment of the steps of executing the training object.

FIG. 4 illustrates a flowchart further defining one embodiment of executing the training object, step 166 of FIG. 3. This step further includes reading a learning map in the training object, step 170. The next step, step 172, is performing the operation of the KTAs within the KTOs within the KTMs of the learning map, including providing an output signal to the output device.

The next step, step 174, is receiving user input from an input device in response to the output signals. As discussed with respect to FIG. 1, the user input 114 may be provided through the input device 106 to generate the input signal 116 provided to the processing device 102. The next step, step 176, is completing the worksets within the learning map. With respect to the exemplary embodiment of FIG. 2, the learning map includes two worksets having KTM (W1) 134 and KTM (W2) 136. Completing the execution of the KTAs, such as 142-144, provides the training associated with the learning map. Thereupon, in one embodiment, this method is complete.

Targeted software training techniques allow the users to achieve user proficiency without the need for inefficient training activities. Using the training database, users are provided with just in time targeted software training directed to specific software application activities, which increases users efficiently. Also, through the delivery of the training objects to the processing device, users are provided with convenient software training in a comfortable environment on their existing computing system instead of a separate training facility.

Through the customization of the training objects, the software training technique is further improved by focused training. The targeted training of the customized training objects further improves a user's efficiency by eliminating training activities associated with extraneous or redundant material. Therefore, users are trained one the software operations specific to their intended use of the software application itself.

Although the preceding text sets forth a detailed description of various embodiments, it should be understood that the legal scope of the invention is defined by the words of the claims set forth below. The detailed description is to be construed as exemplary only and does not describe every possible embodiment of the invention since describing every possible embodiment would be impractical, if not impossible. Numerous alternative embodiments could be implemented, using either current technology or technology developed after the filing date of this patent, which would still fall within the scope of the claims defining the invention.

It should be understood that there exist implementations of other variations and modifications of the invention and its various aspects, as may be readily apparent to those of ordinary skill in the art, and that the invention is not limited by specific embodiments described herein. For example, the training database may be locally disposed with the processing device for immediate access, the database may be accessible via a networked connection or specific training objects may be predisposed in a local memory location functioning as the training database based on the intended user. It is therefore contemplated to cover any and all modifications, variations or equivalents that fall within the scope of the basic underlying principals disclosed and claimed herein.

What is claimed is:

1. A software training method for customized activities using an application software program, the customized activities requiring multiple commands be entered by a user of the application program, the method comprising:

monitoring commands the user enters while using the application software program;

determining whether the user needs training for one of the customized activities based at least on an entered command by the user, a role of the user in a company, and historical data stored for the user for the customized activities, wherein the role of the user defines which customized activities the user needs to perform for the company, and wherein the training for the customized activities includes training created for and specific to the company;

if the user needs training, retrieving at least one training object based at least on the user role and the customized activity, and executing the training object to present the training session for the customized activity to the user, wherein the customized activity includes a series of commands not defined by the application software program and the entered command.

2. The method of claim 1 further comprising:
accessing the training database using the user identification to retrieve the training object based on the user identification.

3. The method of claim 2 wherein the user identification includes a user skill level identifier.

4. The method of claim 2 wherein the user identification includes a user usage-type identifier.

5. The method of claim 1 wherein the step of executing the training object further includes:
reading a learning map in the training object;
performing the operations of one or more worksets including providing one or more output signals to one or more output devices; and
receiving user input from at least one input device in response to the one or more output signals.

6. The method of claim 1 wherein the step of electronically detecting when the training session may be utilized includes:
monitoring the user activity;
comparing the user activity with a master list of activities; and
determining if the training object is appropriate based on the master list.

7. The method of claim 1 wherein the training objects includes one or more knowledge transfer modules having one or more knowledge transfer objects having one or more knowledge transfer assets.

8. The method of claim 7 further comprising:
displaying the training object; and
receiving a user input selecting at least one of: a knowledge transfer module, a knowledge object and a knowledge transfer asset.

9. The method of claim 1 further comprising:
prior to executing the training object, executing a self-test operation; and
determining whether to execute the training object based on the self-test operation.

10. A software training apparatus for customized activities using an application software program, the customized activities requiring multiple commands be entered by a user of the application program, the method comprising:
a memory device having executable instructions stored therein;
a training database having training objects stored therein; and a processing device in operative communication with the memory device and the training database such that the processing device is operative to, in response to the executable instructions:
monitoring commands the user enters while using the application software program;
whether the user needs training for one of the customized activities based at least on an entered command by the user, a role of the user in a company, and historical data stored for the user for the customized activities, wherein the role of the user defines which customized activities the user needs to perform for the company, and wherein the training for the customized activities includes training created for and specific to the company;
if the user needs training, retrieve the training object based at least on the user role and the customized activity, and
executing the training object to present the training session for the customized activity to the user, wherein the customized activity includes a series of commands not defined by the application software program and the entered command.

11. The apparatus of claim 10 wherein the processing device is further operative to:
retrieve the training object based on a user identification.

12. The apparatus of claim 11 wherein the user identification includes a user usage-type identifier.

13. The apparatus of claim 11 wherein the user identification includes a user skill level identifier.

14. The apparatus of claim 10 further comprising:
at least one output device;
at least one input device; and
the processing device is further operative to, in response to the executable instruction:
read a learning map in the training object;
perform the operations of one or more worksets including providing one or more output signals to the at least one output device; and
receive user input from the at least one input device in response to the one or more output signals.

15. The apparatus of claim 10 wherein the processing device, when executing the step of electronically detecting when a training session may be utilized, further:
monitors the user activity;
compares the user activity with a master list of activities; and
determines if the training object is appropriate based on the master list.

16. The apparatus of claim 10 wherein the training objects includes one or more knowledge transfer modules having one or more knowledge transfer objects having one or more knowledge transfer assets.

17. The apparatus of claim 16 wherein the processing device is further operative to, in response to the executable instruction:
display the training object; and
receive a user input selecting at least one of: a knowledge transfer module, a knowledge
object and a knowledge transfer asset.

18. The apparatus of claim 10 wherein the processing device is further operative to, in response to the executable instruction:
prior to executing the training object, execute a self test operation; and
determine whether to execute the training object based on the self test.

19. A software training method for customized activities using an application software program, the customized activities requiring multiple commands be entered by a user of the application program, the method comprising:
- monitoring commands the user enters while using the application software program;
- determining whether the user needs training for one of the customized activities based at least on an entered command by the user, a role of the user in a company, and historical data stored for the user for the customized activities, wherein the role of the user defines which customized activities the user needs to perform for the company, and wherein the training for the customized activities includes training created for and specific to the company;
- if the user needs training, retrieving at least one training object based at least on the user role and the customized activity, and
- executing the training object to present the training session for the customized activity to the user, wherein the customized activity includes a series of commands not defined by the application software program and the entered command.

20. The method of claim 19 wherein the training objects includes one or more knowledge transfer modules having one or more knowledge transfer objects having one or more knowledge transfer assets, the method further comprising:
- displaying the training object; and
- receiving a user input selecting at least one of: a knowledge transfer module, a knowledge object and a knowledge transfer asset.

21. The method of claim 20 further comprising:
- prior to executing the training object, executing a self test operation; and
- determining whether to execute the training object based on the self test.

* * * * *